United States Patent [19]
Narasimhan et al.

[11] Patent Number: 6,073,165
[45] Date of Patent: Jun. 6, 2000

[54] FILTERING COMPUTER NETWORK MESSAGES DIRECTED TO A USER'S E-MAIL BOX BASED ON USER DEFINED FILTERS, AND FORWARDING A FILTERED MESSAGE TO THE USER'S RECEIVER

[75] Inventors: Anand Narasimhan, Beverly Hills; Yaacov Shemesh, Canoga Park, both of Calif.; Jude M. Flannery, New York, N.Y.; Jason Thaxter, Venice, Calif.

[73] Assignee: Jfax Communications, Inc., Los Angeles, Calif.

[21] Appl. No.: 08/902,400

[22] Filed: Jul. 29, 1997

[51] Int. Cl.[7] .................................................. G06F 13/00
[52] U.S. Cl. ........................................ 709/206; 709/223
[58] Field of Search .................................... 709/201, 202, 709/205, 206, 203, 217, 218, 223, 226; 455/412, 31.2; 379/100.01

[56] References Cited

U.S. PATENT DOCUMENTS

| | | | |
|---|---|---|---|
| 5,487,100 | 1/1996 | Kane | 455/31.2 |
| 5,604,788 | 2/1997 | Tett | 455/412 |
| 5,608,786 | 3/1997 | Gordon | 370/352 |
| 5,675,507 | 10/1997 | Bobo, II | 709/206 |
| 5,712,907 | 1/1998 | Wegner et al. | 379/112 |
| 5,740,231 | 4/1998 | Cohn et al. | 379/88.22 |
| 5,742,668 | 4/1998 | Pepe et al. | 455/415 |
| 5,758,088 | 5/1998 | Bezaire et al. | 709/232 |
| 5,765,033 | 6/1998 | Miloslavsky | 709/206 |

*Primary Examiner*—Viet D. Vu
*Attorney, Agent, or Firm*—Blakely Sokoloff Taylor & Zafman LLP

[57] ABSTRACT

A message processing and forwarding system for processing electronic messages in a digital format received over a computer communication path or network, and forwarded over a telephone circuit switched network to a user's receiver, such as a pager. A content processor in a message server processes the received digital message in accordance with knowledge of the receiver's capabilities and user-configured message filtering information to create a customized second message suitable for handling by the user's receiver at a remote physical location. Also, the system defines a distributed architecture for global paging, including multiple redundancy, to yield a robust system. In a preferred embodiment, the original digital message is part of an e-mail message received and forwarded through a conventional computer communication network such as the Internet.

28 Claims, 3 Drawing Sheets

FILTERING COMPUTER NETWORK MESSAGES DIRECTED TO A USER'S E-MAIL BOX BASED ON USER DEFINED FILTERS, AND FORWARDING A FILTERED MESSAGE TO THE USER'S RECEIVER

BACKGROUND INFORMATION

The invention is related to communication between computers and over telephone and wireless networks.

The last half of our rapidly expiring century has been dominated by the emerging importance of communication through networks of computers. Computer communication has become increasingly popular because of its ability to convey multimedia messages in a precise and predictable manner. The popularity of electronic mail has been boosted with the emergence of the Internet as a worldwide network of computers, where people all over the world can effortlessly communicate with each other over the Internet. The future also continues to promise further developments in this area as communications between computers is steadily being improved through faster and cheaper links that extend all over the world.

Although the revolution in computer communications has provided a new and useful platform for individuals to communicate with each other, the capabilities and flexibility of computer communication dictates increasingly complex hardware and software requirements for the end user. Thus, for example, a user seeking to receive electronic mail over the Internet needs no less than a notebook computer configured with a modem device and communication software. More importantly, the user must establish a communication path through a circuit switched telephone network before being able to receive e-mail messages. Thus, there is a need for a system to convey such types of messages to a user through a less complicated and more direct means.

SUMMARY

The invention is directed at a message processing and forwarding system that receives messages over a computer communication network and after processing the messages forwards them to a receiver such as a pager.

In one embodiment, the invention includes a source message server configured to process a received computer-readable first message. A message filter is configured and used to select the first message that is further processed by a content processor to create a second message of content and format that are compatible with the receiver. The second message is assigned a computer network destination address and a circuit switched destination address. These addresses are obtained by consulting a database which stores pre-defined filtering and forwarding parameters for an account associated with the destination network address of the first message.

The second message is then sent to a destination message server generally at a remote location identified by the assigned computer network destination address. When the destination message server receives the second message via the computer communication network, the second message is then sent to a forwarding service, normally identified by the assigned circuit switched destination address.

In a particular embodiment of the invention, the circuit switched destination address is a telephone number for a paging service. The paging service after receiving a call signal and the second message then notifies the receiver through a paging network and forwards the second message.

The invention can thus be used to notify a user with a pager of received e-mail messages without the user having to access a computer communication terminal. The user can customize the filtering and forwarding parameters to select from among the messages received by the source message server on behalf of the user. Furthermore, the system can be used to avoid long distance telephone toll fees normally generated when making a call to a remote paging service by sending a request for a page as a computer message over, for example, the Internet to the destination message server which then relays the request as a local telephone call to the paging service.

DRAWINGS

These and other features, aspects, and advantages of this invention will be better understood with regard to the following description, appended claims, and accompanying drawings where:

DETAILED DESCRIPTION

As summarized above, the invention presents a system and related method for efficiently communicating a message received in digital format over a communication network to a receiver that is preferably smaller than, and most likely less complex than, a traditional computer. Such a receiver may be a simple numeric or alpha-numeric pager having receiving and also perhaps limited transmitting capability, a portable wireless telephone, the combination of a telephone and pager, and the combination of a handheld computer and a pager. A preferred embodiment is the simple and compact pager normally carried on or otherwise closely coupled to the user's person.

For purposes of explanation, specific embodiments are set forth below to provide a thorough understanding of the invention. However, as understood by one skilled in the art, from reading this disclosure, the invention may be practiced without such details. Furthermore, well-known elements, devices, process, steps, and the like, are not set forth in detail in order to avoid obscuring the invention.

Figure 1:
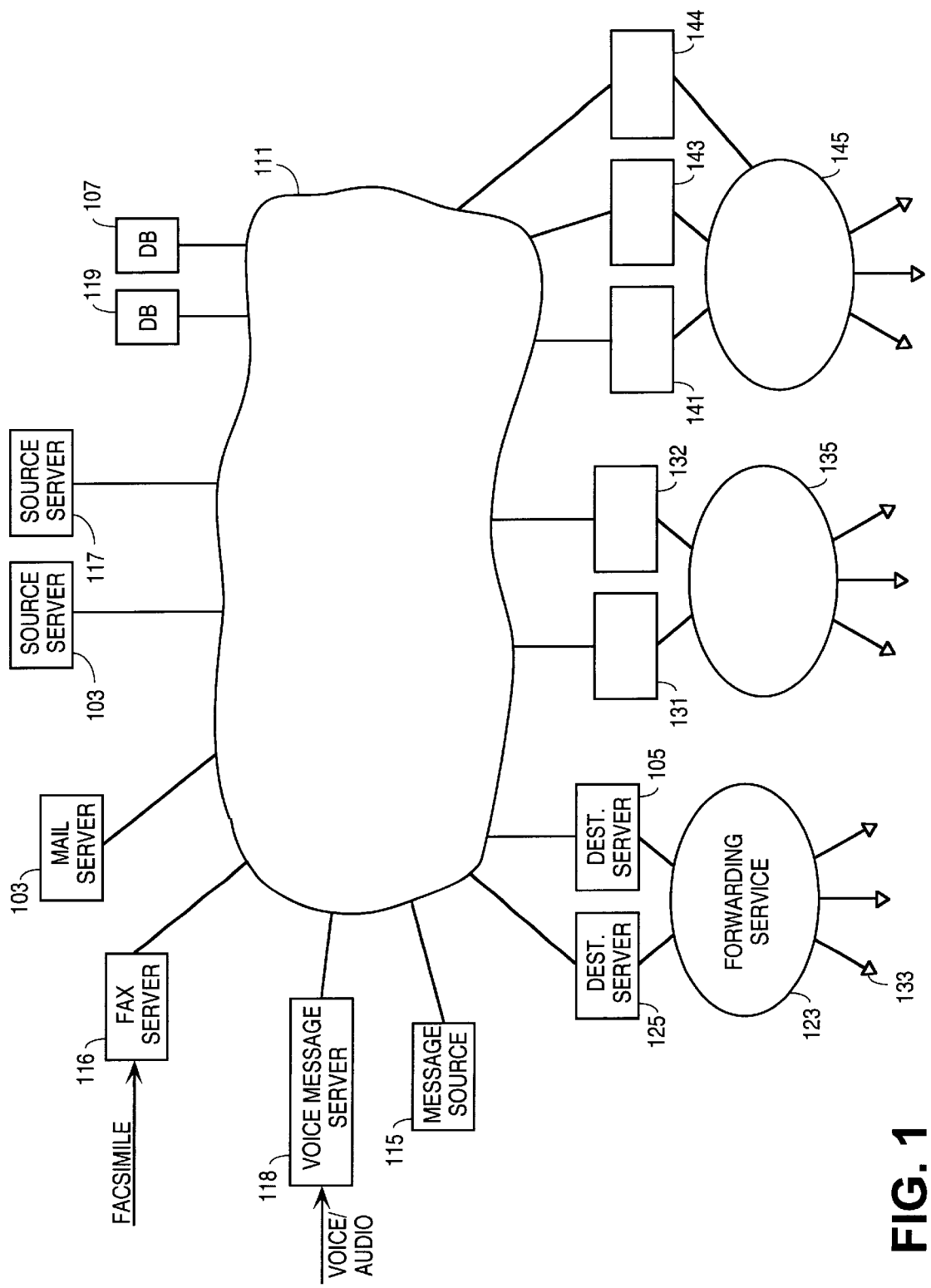
FIG. 1 illustrates a system level view of the invention according to one embodiment.

Before considering some details of the invention, a bird's eye view of an embodiment of the invention is presented in FIG. 1. The message processing and forwarding system of the invention permits communication between a source 116 or 115 and a receiving device or receiver 133 through a layered architecture. A pair of message servers 103 and 105 are linked by a computer communication network (CCN) 111 as an upper layer, whereas a number of different forwarding services 123, 135 and 145 form the lower layer. The interface between the upper and lower layers is provided by a number of destination servers 105, 132 and 144 together with any additional or alternate servers 125, 131, 141, and 143. The different forwarding services 123, 135, and 145 may be located in different parts of the world, as covered by the umbrella of CCN 111. The CCN 111 may be a wide area network (WAN) or even a larger enterprise network such as the Internet. An exemplary configuration of the system in FIG. 1 will now be described.

The ultimate source and destination of a message may be the first message source 115 and a receiver 133. The first message source 115 may be any entity which generates a computer message, one that can be processed and forwarded by a packet-switched computer communication network. The system may also be configured with voice message server 118 and fax server 116 which receive and understand voice/audio and facsimile information, respectively, and in response create and send a computer message. The computer message may be, for example, an e-mail message sent to a given e-mail address.

In the particular embodiment of FIG. 1, messages from the first message source 115, voice message server 118, or facsimile server 116 are received by a mail server 104 that provides e-mail receipt, storage and transmission services using a protocol such as the simple mail transfer protocol (SMTP) and post office protocol (POP). The source server 103 may be configured as a client of the mail server 104 to communicate over the CCN 111, using SMTP or POP, to retrieve e-mail from the mail server 104. Another suitably configured back-up mail server (not shown) may also be implemented for robustness of the overall system.

In one embodiment, the source server 103 communicates with a database server 107 to access a copy of a user's account information. The database server 107 may also contain a copy of the network addresses needed to communicate with the destination servers. Although shown as connecting through the CCN 111, the source server 103 and the database server 107 can be configured as part of a separate subnetwork that couples with the larger CCN 111. Also, as will be recognized by one skilled in the art, different combinations of hardware and software can be used to implement the source server and database server. In one embodiment, each of the source server 103, and database server 107, and mail server 104 reside in stand-alone computers or workstations containing the hardware and software resources needed to enable operation of the invention. In alternate embodiments, however, their functions may be supplied through any number of computer systems.

The servers and databases communicate with each other through the CCN 111 using such protocols as the simple network management protocol (SNMP) and hyper-text transport protocol (HTTP)—packetized using a protocol such as the Transmission Control Protocol, and Internet Protocol (TCP/IP).

The destination server 105 will likely be located at a remote physical location than the source server 103. The destination server 105 communicates with a forwarding service 123 (such as a paging service) normally through a circuit switched telephone network. The circuit switched telephone network can be a public switched telephone network (PSTN), or a generalized switch telephone network (GSTN) which encompasses PSTN networks, cellular telephone networks, and pager broadcast networks. The forwarding service 123 is capable of communication with a number of different receivers 133 such as a conventional numeric or alphanumeric pager. In a preferred embodiment, the destination server 105 and the forwarding service 123 will be physically located such that telephone calls to the forwarding service 123 will be of the less costly "local zone" type.

Figure 2:
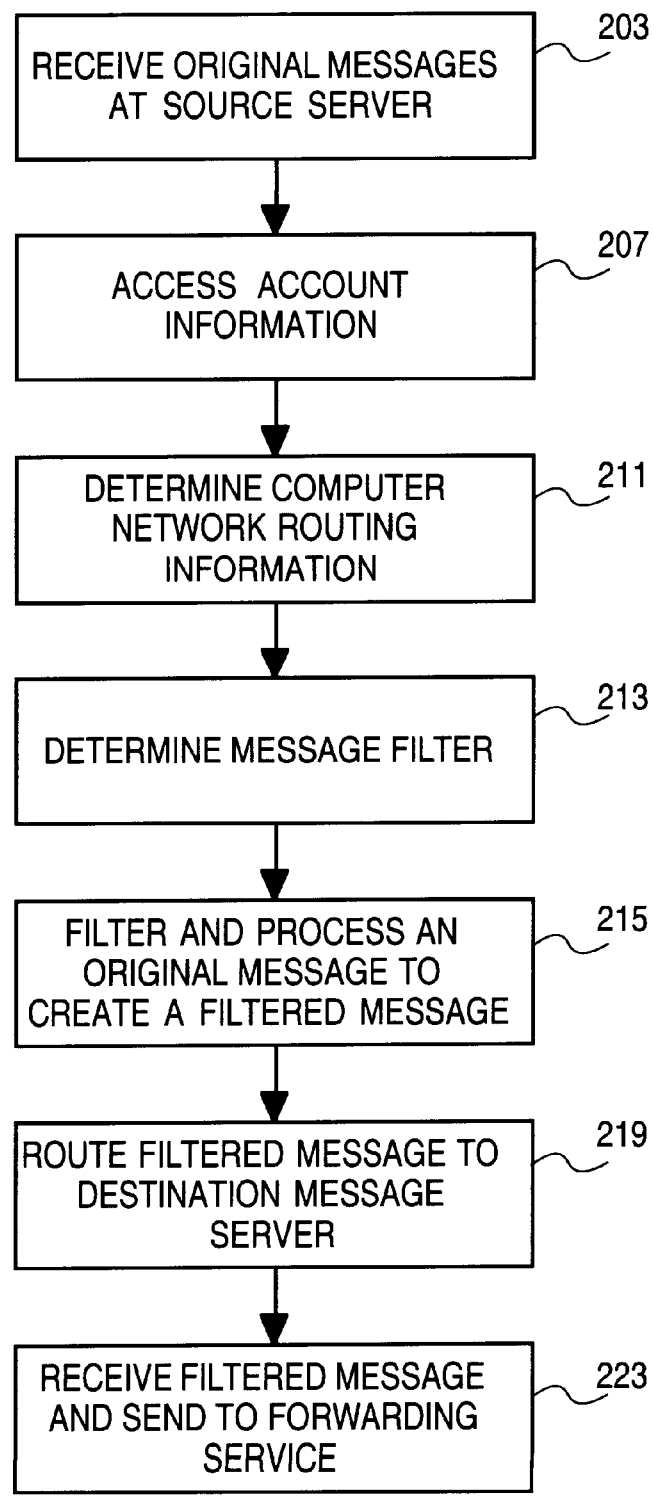
FIG. 2 shows a list of steps to be performed as an embodiment of the invention.

The invention's operation in one embodiment will now be described with reference to FIGS. 1 and 2. FIG. 2 illustrates a flow diagram of the steps performed by the various entities of FIG. 1 as an embodiment of the invention's message processing and forwarding system.

Beginning with block 203, the source server 103 is notified of computer messages, perhaps received by the mail server 104. As indicated earlier, the original messages will be encapsulated as computer messages, for example, in the form of or part of an e-mail message having headers and a body. The original message may be requesting, for example, that a user carrying the receiver 133 be paged, and that a certain message be conveyed. As a client to the mail server 104, the source server 103 is notified by a process on the mail server 104 using, for example, SMTP in the same manner as a standard mail client. For that embodiment, the notification would include receipt of an e-mail header by source server 103.

While the source server 103 retrieves the computer messages, operation may continue concurrently with block 207 where the source server 103 accesses information associated with a user account. The account may be identified, for example, by a destination address of the computer messages, such as e-mail addresses. Alternatively, the account may be associated with one or more fields of data contained in the computer messages.

In one embodiment, the account information may include an account number, an account balance and other billing information, the user's e-mail address for receiving the computer messages, one or more forwarding service addresses such as telephone numbers, and perhaps a forwarding service access code or password that may identify a particular pager device. Alternatively, the original message itself might contain the address (e.g., phone number) of the forwarding service and/or the access code.

The account information may also identify a receiver 133 as associated with a particular type of forwarding service. This information may be used by the source server 103 to determine the capability of the receiver 133 for receiving messages of different content and media formats. For example, a certain pager service may be exclusive to only numeric messages, whereas other pagers and pager services might support text as well as numeric messages. As further explained below, such information regarding the type of forwarding service is used to configure a filtered message that has a content and format suitable for processing by the receiver 133.

The account information may also identify one or more destination servers 105 by their addresses, for example, their Internet Protocol (IP) addresses. Thus, in block 211, the source server 103 determines the computer network routing information required for sending the filtered message to the destination server 105. Several destination message servers (as several network addresses) may be listed in the account information as being capable of forwarding the filtered message. Alternatively, the destination server may be selected in the received original message, with the network address of the destination server being previously stored or programmed into a database, the source server 103, or a separate database server 119.

As mentioned earlier, the original message is received as part of a computer-readable message, whereas the receiver 133 may not be capable of displaying or responding to the original message. Therefore, in block 213, the source server determines the message filter parameters and other processing parameters needed to select and process an original message into a filtered message that will be compatible with the display and processing characteristics of the ultimate receiver 133.

Figure 3:
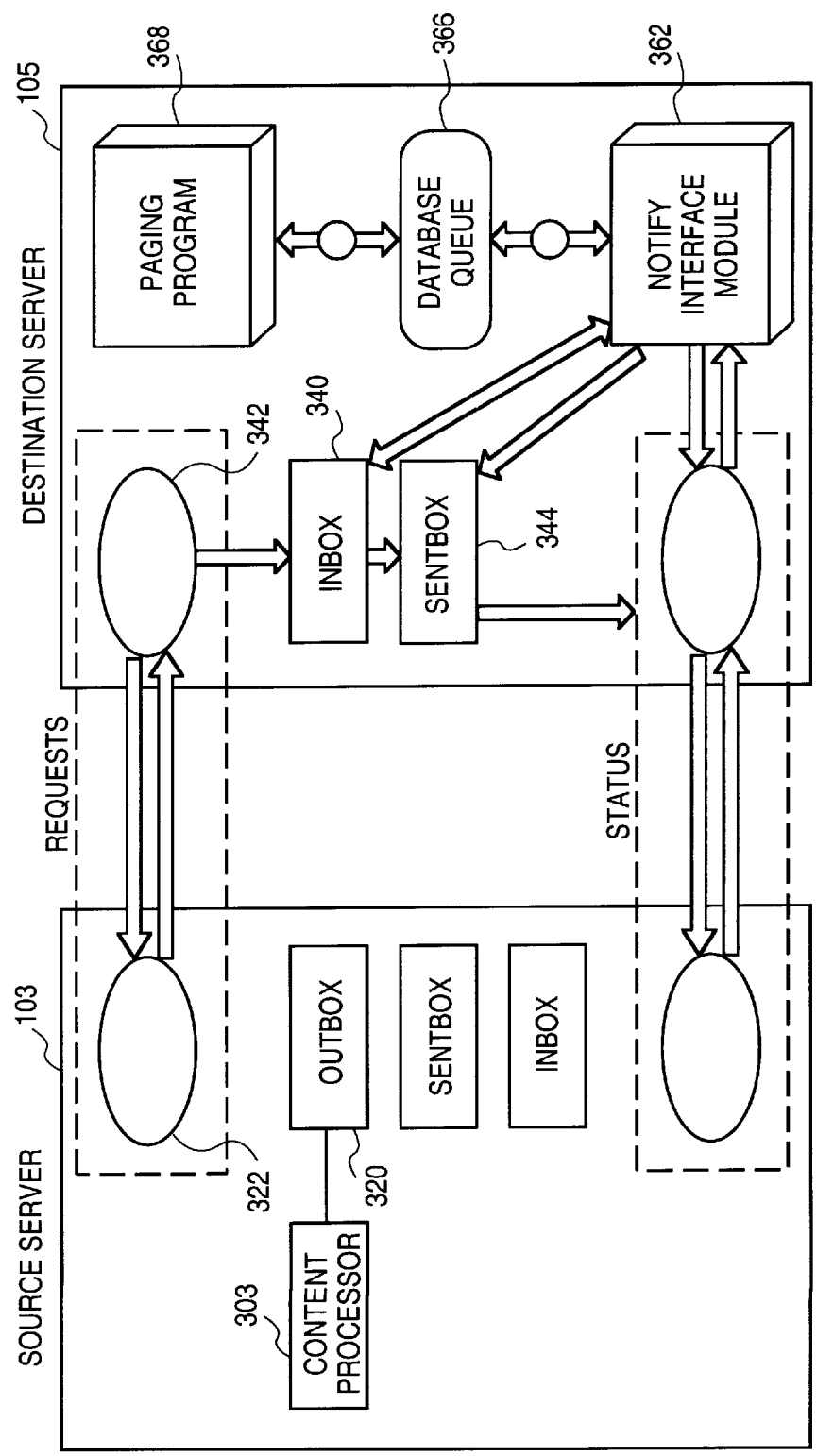
FIG. 3 is a data flow diagram of the message servers according to another embodiment of the invention.

The embodiment of the source server 103 in FIG. 3 provides a content processor 303 that performs a message processing function on the received original messages based on knowledge of the message reception capability of the receiver. The content processor 303 contains at least two main functions: message filtering and content processing.

Message filtering results in the selection of which of the received original messages will undergo content processing. Message filtering is obtained through a rules-based scheme where specific data fields along with their values are indicated as the filtering criteria. For the embodiment that processes and forwards original messages as part of e-mail messages, such data fields include Sender, Recipient, Subject and File Attachment of the e-mail message. Search terms and phrases in the filter criteria may be applied to give further flexibility in selecting a message to be processed and forwarded. For example, the filtering criteria may be programmed to select all e-mail messages sent by a particular individual, or all messages on a particular subject, or all messages with the word 'urgent' in the message body, or any combination of such criteria.

Once the message filter has been determined, and an original message is selected on that basis, operation continues with block 215 where content processing translates the selected original message into a second or filtered message. The filtered message has content that can be processed by the receiver 133. A rule-based approach is also used in the content processing in order to craft the filtered message so that it can be received and displayed or otherwise responded to by the receiver 133. For example, if receiver 133 is a 20-character alphanumeric pager, then the rules will permit no more than 20 characters in the filtered message. After recognizing constraints such as the number and type of characters available for the particular receiver, the content processor will determine the most relevant characters to place in the filtered message, as a function of the message filter criteria, and rule-based algorithms such as key word selection, article elimination, message truncation, and message source identification.

After creating the filtered message, the source server 103 encapsulates the filtered message and an associated address of the forwarding service in another computer message, addressed to a selected destination server. The source server 103 may also include a receiver access code in the computer message, if needed. In one embodiment, the computer message may be an HTTP message to be communicated using the POST mechanism. The computer message may also be routed through various nodes of CCN 111 to ultimately arrive at the destination server 105. An alternate destination server 125 may be used (normally listed in a database) in the event the destination server 105 does not respond.

Moving on to block 223, the destination server 105 receives the computer message over the CCN 111 and processes it to obtain the address of the forwarding service and perhaps the access code used to reach the receiver 133. The filtered message is also retrieved and parsed to obtain, for example, a numeric (or alpha-numeric) message to be forwarded. The destination server 105 then activates certain resources needed to connect with the forwarding service 123 based on the identity of the forwarding service identified in the computer message, and sends the filtered message to the forwarding service as a telephone call.

After a call is made to the forwarding service, and the filtered message has been sent, the destination server 105 may return acknowledgment information that identifies the particular filtered message and its forwarding status. Meanwhile, the source server 103 may update the account information, such as adjusting the balance, to reflect the recently transmitted filtered message.

FIG. 3 illustrates a data flow diagram of the operations in and between the message servers, according to an embodiment of the invention. As the computer messages (including filtered messages) are received in outbox 320 in the source server 103, a source process 322 such as a Unix Perl Script, sends the computer messages over the Request connection to the destination server 105.

The computer messages received by the destination server 105 are placed in the inbox 340. A Notify Interface Module 362 retrieves a computer message from the inbox 340 and places it in the sentbox 344. After extracting data such as the filtered message, forwarding service address, and access code from the computer message, the extracted data is queued in database queue 366 to be processed by a paging program 368. Status notifications to the source server 103, reporting the filtered messages that were forwarded, are sent over the Status connection after receiving status acknowledgment from the paging program.

The paging program 368 is responsible for causing the filtered message to be sent to the appropriate forwarding service normally identified by a telephone number. In one embodiment, the paging program 368 invokes conventional computer modem software (not shown), to cause the forwarding service telephone number to be dialed by a modem. When the forwarding service answers, the modem then sends an access code (if needed) and the filtered message, encoded in the signaling format specific to the forwarding service. The forwarding service thereafter forwards the filtered message to the receiver 133. The filtered message may then be received by the user, for example, as a page. In another embodiment, the receiver 133 may be capable of performing control functions in response to receiving the filtered message, for example, as a controller to re-start, turn-on or turn-off a computer or other electrically controlled device.

Having described the basic operation of various embodiments of the invention, certain other useful additions to, variations in, and advantages of the embodiments are now presented. In another embodiment of the processing and forwarding system, the account information including the filter criteria as well as the rules for the content processing may be defined by the human user of the account through a World Wide Web (Web) browser-based interface to the source message server 103. The user may also program information such as the desired destination server to be used for forwarding the filtered messages. These allow the user to fully customize message handling for his or her account. Another access mechanism for the user may be a conventional telephone interactive voice response system that communicates with the source server 103.

The processing and forwarding system embodiments described above may also be configured to respond to a facsimile or voice message by sending an original computer message to the user's e-mail address to be processed as described above. In this case, the voice message may be from a person leaving a voice message for the user. The voice message is stored by the voice message server 118 and an e-mail or other suitable original message addressed to the user's account in the source server 103 is then created and sent. The user can configure the message filter parameters to recognize the original message as indicating that a voice mail or facsimile has been recorded. The filtered message will then notify the user via receiver 133 that such a message has arrived.

Another useful aspect of the embodiment in FIG. 1 is the provision for redundancy by the inclusion of an alternate source server 117, mirrored database 119, and alternate destination server 125. The overall system may be configured to detect failures in either the source or destination servers, and database server 107, and replace their functions with an alternate server and/or mirrored database 119. This may be accomplished by configuring the message servers 103 and 105 to recognize failure conditions (such as failure return codes, or lack of a successful return code) and accordingly reallocate resources in the event of failures with either the servers or the database, such that a message is rerouted via a redundant resource or connection to ensure that the message is reliably forwarded to the receiver 133. The system will thus adaptively reconfigure itself in response to changing network and communication conditions.

An added benefit of the multiple redundancy, available when additional source and destination servers are present to handle the message traffic, is that the system may be upgraded or repaired piecemeal, such that the entire system need not be shut down.

The various embodiments described above also define a system that is easily scalable in that message handling capacity can be increased by simply adding additional servers and databases, without resulting in any serious bottlenecks. The above discussion also reveals that in certain embodiments, the source server 103 may be essentially cloned because it supports few, if any, functionality unique characteristics, especially if the account information can be accessed from one or more previously established database servers.

To summarize, the embodiments of the message processing and forwarding system of the invention provide an approach for unifying a group of otherwise isolated and disparate forwarding services across the world using a global computer communication network as a higher layer mechanism for translating and forwarding messages, to provide multi-national coverage for different classes of receivers.

While the above description contains many specifics, these should not be construed as limitations on the scope of the invention, but rather as examples of different embodiments. Many other variations are possible. For example, different communication protocols may be used between the source and destination servers to implement the Requests and Status connections. Also, certain steps described as occurring sequentially may alternatively be performed concurrently depending on the particular implementation, provided the functional dependencies are adhered to.

Therefore, the scope of the invention should be determined not by the embodiments illustrated but by the appended claims and their legal equivalents.

What is claimed is:

1. A message processing and forwarding system, comprising:
    source server configured to receive a plurality of computer network messages directed to a user's e-mail box, and create a filtered message after extracting data from a selected one of the plurality of messages, the source server for sending the filtered message to a first address; and
    first destination server having the first address and communicatively coupled to the source server, the first destination server in response to receiving the filtered message causing the filtered message to be sent to a first forwarding service; and
    a fax server communicatively coupled to at least one of the e-mail box and the source server via the computer communication network, wherein the fax server is configured to send a notify message to at least one of the e-mail box and the source server in response to receiving a facsimile at the user's facsimile number, the notify message indicating that the user has received a facsimile, and the source server receives the notify message and forwards the notify message to the first address of the destination server which then forwards the notify message to the first forwarding service.

2. A system as in claim 1 wherein the filtered message is sent from the source server to the host server using an electronic mail messaging protocol.

3. A system as in claim 1 wherein the source server is configured to select one of the plurality of computer network messages in accordance with a message filter that defines search criteria used in parsing the plurality of computer network messages.

4. A system as in claim 1 wherein the first forwarding service is a paging service.

5. A system as in claim 1 wherein the source server sends the user's pager telephone number, associated with the filtered message, to the first destination server.

6. A system as in claim 5 wherein the source server obtains the telephone number by accessing user account information database which associates the telephone number with a computer network address, wherein the computer network address is the destination address of the plurality of received computer network messages.

7. A message processing and forwarding system, comprising:
    source server configured to receive a plurality of computer network messages directed to a user's e-mail box, and create a filtered message after extracting data from a selected one of the plurality of messages, the source server for sending the filtered message to a first address; and
    first destination server having the first address and communicatively coupled to the source server, the first destination server in response to receiving the filtered message causing the filtered message to be sent to a first forwarding service; and
    a voice server communicatively coupled to at least one of the e-mail box and the source server via the computer communication network, wherein the voice server is configured to send a notify message to at least one of the e-mail box and the source server in response to receiving a voice message at the user's voice mail number, the notify message indicating that the user has received a voice message, and the source server receives the notify message and forwards the notify message to the first address of the destination server which then forwards the notify message to the first forwarding service.

8. An article of manufacture comprising:
    a machine-readable medium having instructions which when executed by a processor cause a computer system to
    select one of a plurality of received computer network messages based on a predefined filter that is defined by a user and that matches a content of one or more fields in a selected message, the selected message including a notify message from at least one of a user's e-mail box and a fax server, the notify message indicating that the user has received a facsimile at a facsimile number of the user;
    create a filtered message in response to extracting data from the selected message based on filtering rules defined by the user; and send the filtered message to a first address of a message forwarding service over a computer communication network, the first address being associated with the predefined filter and a user's receiver, the forwarding service being in communication with the user's receiver to forward the filtered message to the receiver.

9. An article of manufacture comprising:

a machine-readable medium having instructions which when executed by a processor cause a computer system to select one of a plurality of received computer network messages based on a predefined filter that is defined by a user and that matches a content of one or more fields in a selected message, the selected message including a notify message from at least one of the user's e-mail box and a voice server, the notify message indicating that the user has received a voice message at a voice mail of the user;

create a filtered message in response to extracting data from the selected message based on filtering rules defined by the user; and send the filtered message to a first address of a message forwarding service over a computer communication network, the first address being associated with the predefined filter and a user's receiver, the forwarding service being in communication with the user's receiver to forward the filtered message to the receiver.

10. The article of manufacture of claim 9 further comprising instructions which cause the system to send the filtered message to the message forwarding service using an electronic mail messaging protocol.

11. The system of claim 6 wherein the user account information database further stores one or more message filters for each user account.

12. The system of claim 1 wherein the source server selects one of the plurality of messages based on a content of one or more message fields matching a predefined filter, the system further comprising:

user account information database containing the predefined filter, the filter being associated with a computer network address being the destination address of the plurality of computer network messages received by the source server.

13. The system of claim 12 wherein the predefined filter is definable in a computer graphical user interface accessible by the user to customize the processing and forwarding of the plurality of computer network messages.

14. The system of claim 13 wherein the user interface is part of a network browser application program.

15. The system of claim 13 wherein the source server creates the filtered message based upon knowledge of the message reception capability of the user's receiving device, the capability being identified in the user account information database and associated with said predefined filter, the receiving device being one of an alphanumeric pager, a portable wireless telephone, and a handheld computer-pager combination.

16. The system of claim 1 further comprising an alternate source server identical to the source server; and, an alternate destination server identical to said at least one destination server, wherein the alternate source and destination servers have access to the data needed for processing and forwarding the plurality of computer network messages.

17. The system of claim 15 wherein the plurality of computer network messages do not identify the type of the user's receiving device.

18. The system of claim 7 wherein the filtered message is sent from the source server to the host server using an electronic mail messaging protocol.

19. The system of claim 7 wherein the first forwarding service is a paging service.

20. The system of claim 7 wherein the source server sends the user's pager telephone number, associated with the filtered message, to the first destination server.

21. The system of claim 7 wherein the source server selects one of the plurality of messages based on a content of one or more message fields matching a predefined filter, the system further comprising:

user account information database containing the predefined filter, the filter being associated with a computer network address being the destination address of the plurality of computer network messages received by the source server.

22. The system of claim 21 wherein the predefined filter is definable in a computer graphical user interface accessible by the user to customize the processing and forwarding of the plurality of computer network messages.

23. The system of claim 22 wherein the source server creates the filtered message based upon knowledge of the message reception capability of the user's receiving device, the capability being identified in the user account information database and associated with said predefined filter, the receiving device being one of an alphanumeric pager, a portable wireless telephone, and a handheld computer-pager combination.

24. The article of manufacture of claim 9 further comprising instructions which cause the system to send the filtered message to the message forwarding service using an electronic mail messaging protocol to access a user account information database containing the predefined filter, the filter being associated with a computer network address being the destination address of the plurality of received computer network message.

25. The article of manufacture of claim 24 further comprising instructions which cause the system to provide a user interface accessible by the user to customize the processing and forwarding of the plurality of received computer network messages.

26. The article of manufacture of claim 25 wherein the user interface appears on a Web site.

27. The article of manufacture of claim 24 further comprising instructions which cause the system to create the filtered message based upon knowledge of the message reception capability of the user's receiving device, the capability being identified in the user account information database and associated with said predefined filter, the receiving device being one of an alphanumeric pager, a portable wireless telephone, and a handheld computer-pager combination.

28. The article of manufacture of claim 24 wherein the plurality of computer network messages do not identify the type of the user's receiving device.

* * * * *